US012570272B2

(12) United States Patent
Lemontey et al.

(10) Patent No.: US 12,570,272 B2
(45) Date of Patent: Mar. 10, 2026

(54) METHOD FOR CONTROLLING AT LEAST ONE DEVICE OF A MOTOR VEHICLE, AND ASSOCIATED MOTOR VEHICLE

(71) Applicant: RENAULT S.A.S., Boulogne Billancourt (FR)

(72) Inventors: Philippe Lemontey, Guyancourt (FR); Pablo Thorner, Guyancourt (FR)

(73) Assignee: RENAULT S.A.S., Boulogne Billancourt (FR)

( * ) Notice: Subject to any disclaimer, the term of this patent is extended or adjusted under 35 U.S.C. 154(b) by 44 days.

(21) Appl. No.: 18/838,419

(22) PCT Filed: Jan. 20, 2023

(86) PCT No.: PCT/EP2023/051408
§ 371 (c)(1),
(2) Date: Aug. 14, 2024

(87) PCT Pub. No.: WO2023/156136
PCT Pub. Date: Aug. 24, 2023

(65) Prior Publication Data
US 2025/0153708 A1 May 15, 2025

(30) Foreign Application Priority Data
Feb. 18, 2022 (FR) ...................................... 2201472

(51) Int. Cl.
*B60W 30/02* (2012.01)

(52) U.S. Cl.
CPC ....... *B60W 30/025* (2013.01); *B60W 2540/00* (2013.01); *B60W 2555/20* (2020.02)

(58) Field of Classification Search
None
See application file for complete search history.

(56) References Cited

U.S. PATENT DOCUMENTS

| | | | |
|---|---|---|---|
| 10,780,890 B2 * | 9/2020 | McGill | ............... B60W 30/182 |
| 11,260,877 B2 * | 3/2022 | Gohlke | ................ G06N 3/0464 |

(Continued)

FOREIGN PATENT DOCUMENTS

| | | | | |
|---|---|---|---|---|
| CN | 107111956 B | * | 6/2020 | ............ B60W 50/14 |
| DE | 10 2009 030 784 A1 | | 2/2010 | |

(Continued)

OTHER PUBLICATIONS

International Search Report mailed on May 31, 2023 in PCT/EP2023/051408 filed on Jan. 20, 2023 (2 pages).

(Continued)

*Primary Examiner* — Shelley Chen
(74) *Attorney, Agent, or Firm* — Oblon, McClelland, Maier & Neustadt, L.L.P.

(57) ABSTRACT

A method for controlling a device of a motor vehicle includes, in a first time step, receiving data characterizing a state of the vehicle and the environment, determining an initial vector on the basis of the data, selecting a first control profile on the basis of the initial vector, transmitting the first profile so as to control the device, and then, in a second time step, updating the data, determining an updated vector, selecting a second control profile on the basis of the updated vector, and if the second profile is different from the first profile, transmitting the second profile so as to update the control of the device of the vehicle.

12 Claims, 3 Drawing Sheets

(56)  References Cited

U.S. PATENT DOCUMENTS

| | | | | |
|---|---|---|---|---|
| 2016/0214608 | A1 * | 7/2016 | Packwood-Ace ... | B60W 30/143 |
| 2019/0202464 | A1 * | 7/2019 | McGill ............ | B60W 60/0053 |
| 2021/0403039 | A1 | 12/2021 | Horigome et al. | |
| 2023/0174077 | A1 * | 6/2023 | Gohlke .............. | B60W 50/082 |

FOREIGN PATENT DOCUMENTS

| | | | | | |
|---|---|---|---|---|---|
| DE | 112013003595 | T5 * | 4/2015 | ......... | B60H 1/00735 |
| DE | 102018204288 | A1 * | 9/2019 | ............ | B60W 40/09 |
| DE | 102016122641 | B4 * | 11/2021 | ........... | G08G 1/0129 |
| FR | 2857912 | A1 * | 1/2005 | ............ | B62D 6/007 |
| JP | 3951712 | B2 * | 8/2007 | | |
| JP | 2015531714 | A * | 11/2015 | ......... | B60H 1/00735 |
| JP | 2021525675 | A * | 9/2021 | ............ | G06V 20/56 |
| WO | WO-9625636 | A1 * | 8/1996 | ............ | F24F 3/1423 |

OTHER PUBLICATIONS

Preliminary French Search Report dated Sep. 2, 2022 in French Application 2201472 filed on Feb. 18, 2022 (3 pages, with Translation of Categories).

* cited by examiner

METHOD FOR CONTROLLING AT LEAST ONE DEVICE OF A MOTOR VEHICLE, AND ASSOCIATED MOTOR VEHICLE

TECHNICAL FIELD OF THE INVENTION

The present invention relates in general to the control of various devices of a motor vehicle.

It relates more particularly to a method for controlling at least one device of a motor vehicle. It also relates to a vehicle comprising a computer configured to implement such a control method.

PRIOR ART

Driving vehicles, during lengthy or repetitive journeys, may often seem tedious and lead to a risk of the driver of a motor vehicle losing concentration.

The use of driving modes, such as for example "sport" mode or "comfort" mode, then makes it possible to adapt the driving experience so as to make it more variable and attractive regardless of the journey. Each of these known driving modes corresponds to a predetermined set of commands. When one of the modes is used, it is therefore always the same set of commands that is executed, then making the use of these various known modes tedious in the long term.

Document EP2895352 discloses adapting the lighting in the passenger compartment of the motor vehicle on the basis of ambient brightness and objects present in the proximity of the motor vehicle (typically on the basis of the color of these objects). This then makes it possible to adjust the lighting in the passenger compartment on the basis of the environment external to the motor vehicle, and therefore to improve the driving experience for the occupants of the motor vehicle.

However, that document relates only to adapting the lighting in the passenger compartment of the vehicle in order to improve this driving experience. This may be insufficient or unsuitable in some situations, for example in the event of imminent danger in which modifying the lighting will not make it possible to warn the driver to a sufficient extent.

PRESENTATION OF THE INVENTION

The present invention proposes to improve the control of the devices of a motor vehicle so as to make driving less monotonous and more attractive.

More particularly, what is proposed according to the invention is a method for controlling at least one device of a motor vehicle, the method comprising the following steps:
in a first time increment,
- receiving a plurality of data characterizing a state of the motor vehicle, the environment external to the motor vehicle and in particular data concerning one or more of the occupants of the motor vehicle,
- determining an initial vector on the basis of the plurality of received data,
- selecting, from among a plurality of predetermined control profiles for controlling said at least one device, a first control profile on the basis of the initial vector,
- outputting said first control profile so as to control said at least one device of the motor vehicle,
and then, in a second time increment,
- updating at least some of the plurality of data characterizing the state of the motor vehicle and the environment external to the motor vehicle,

- determining an updated vector on the basis of the updated data,
- selecting a second control profile on the basis of the updated vector, and if the second control profile is different from said first control profile,
- outputting said second control profile so as to update the control of said at least one device of the motor vehicle.

Thus, by virtue of the invention, the various devices of the motor vehicle are controlled on the basis of the current characteristics of the vehicle and its environment. The occupants of the motor vehicle are therefore immersed in a multisensory ambience that varies on the basis of the context concerning the vehicle. This then makes it possible to make the journey less monotonous.

Moreover, by virtue of the invention, the multisensory ambiences that are offered are varied enough to avoid the occupants of the vehicle becoming bored.

Other advantageous and non-limiting features of the control method according to the invention, taken on their own or in any technically feasible combination, are as follows:
- provision is also made for a step of evaluating an additional criterion relating to the relevance of a change of control profile for said at least one device, said step of outputting the second control profile being implemented if the evaluated additional criterion is satisfied;
- the additional criterion depends on the time that has elapsed since the first control profile was selected or on a frequency of changing of control profiles or on the presence of a point of interest identified in the environment of the motor vehicle;
- the additional criterion also depends on a preference indicator associated with an occupant of the motor vehicle;
- the second control profile is selected by determining, for each predetermined control profile, a control change appropriateness parameter, on the basis of said updated vector and of a profile vector corresponding to this predetermined control profile;
- for each predetermined control profile, the control change appropriateness parameter is determined by computing a distance between the updated vector and the profile vector corresponding to this control profile;
- the second control profile is selected as corresponding to the control change appropriateness parameter associated with the smallest computed distance;
- provision is also made for steps of:
- a1) locating a one-off and/or local point of interest in the environment of the motor vehicle,
- b1) determining a specific control profile associated with said point of interest, and
- c1) outputting said specific control profile so as to control said at least one device of the motor vehicle;
- the specific control profile is output on a one-off basis for a predetermined duration, said predetermined duration preferably being associated with the point of interest; and
- provision is also made, beforehand, for steps of:
- a2) determining a first list of instructions for a first device of the motor vehicle,
- b2) determining a second list of instructions for a second device of the motor vehicle,
- c2) determining a final matrix by synchronously combining the first and the second list of instructions, and
- d2) determining a control profile on the basis of the determined final matrix in order to synchronously control the first device and the second device.

The invention also relates to a motor vehicle comprising a computer configured to implement a control method as introduced above.

Of course, the various features, variants and embodiments of the invention may be associated with one another in various combinations provided that these are not incompatible or mutually exclusive.

DETAILED DESCRIPTION OF THE INVENTION

The following description with reference to the appended drawings, which are given by way of non-limiting examples, will give a good understanding of the content of the invention and how it may be implemented.

Figure 1:
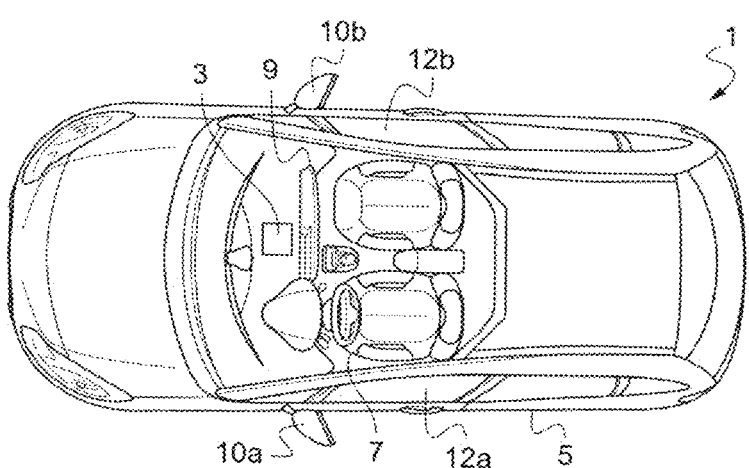
FIG. 1 shows a schematic plan view of a motor vehicle.

FIG. 1 shows a plan view of a motor vehicle 1 (also called vehicle 1 hereinafter). Conventionally, this motor vehicle 1 comprises four wheels, a chassis that supports in particular a drivetrain (namely an engine and means for transmitting the engine torque to the drive wheels), a steering column, bodywork elements 5 and passenger compartment elements 7. The motor vehicle 1 comprises for example two external rear-view mirrors 10a, 10b.

Generally speaking, the motor vehicle 1 comprises various devices that allow it to operate, to ensure the safety of the occupants of the motor vehicle 1, but also to ensure the comfort of the occupants when the motor vehicle 1 is moving. The motor vehicle 1 comprises at least two devices of different types, that is to say configured to carry out different functions.

These devices are, for example and without limitation, the loudspeakers and the lighting elements present in the passenger compartment 7 of the motor vehicle 1, the means for transmitting the engine torque, the power steering members, the braking members, the mechanisms for adjusting the external rear-view mirrors 10a, 10b, the mechanisms for actuating the windows 12a, 12b, a display screen located on a dashboard 9 present in the passenger compartment 7 of the motor vehicle 1, etc.

As shown in [FIG. 1], the motor vehicle 1 also comprises a computer 3. This computer 3 comprises for example a processor, an internal memory, analog-to-digital converters and various input and/or output interfaces.

The computer 3 is configured, by virtue of its input interfaces, to receive input data coming from the various sensors present in the motor vehicle 1.

The memory of the computer 3 stores a computer application, consisting of computer programs comprising instructions the execution of which by the processor allows the computer 3 to implement the methods described below.

This memory also stores various databases comprising for example map data or navigation data. It also stores predetermined control profiles as described below.

Finally, the computer 3 is configured, by virtue of its output interfaces, to monitor and control the various devices of the motor vehicle 1. For example, the computer 3 may transmit an actuation instruction to an actuator coupled to a particular device of the motor vehicle 1, the actuator being for example intended to modify the position of the device in question.

The computer 3 is programmed to implement a method for controlling at least one device of the motor vehicle 1.

According to the invention, this control method aims to control the various devices of the motor vehicle 1 on the basis of the current characteristics of the vehicle and its environment, so as to make driving less monotonous and more immersive.

More particularly, controlling the various devices of the motor vehicle makes it possible to trigger multisensory ambiences so as to assist the driver from a safety point of view (by warning them about a hazardous area for example), but also to continuously stage-manage their journey and draw their attention to particular points of the external environment, for tourism purposes.

Figure 2:
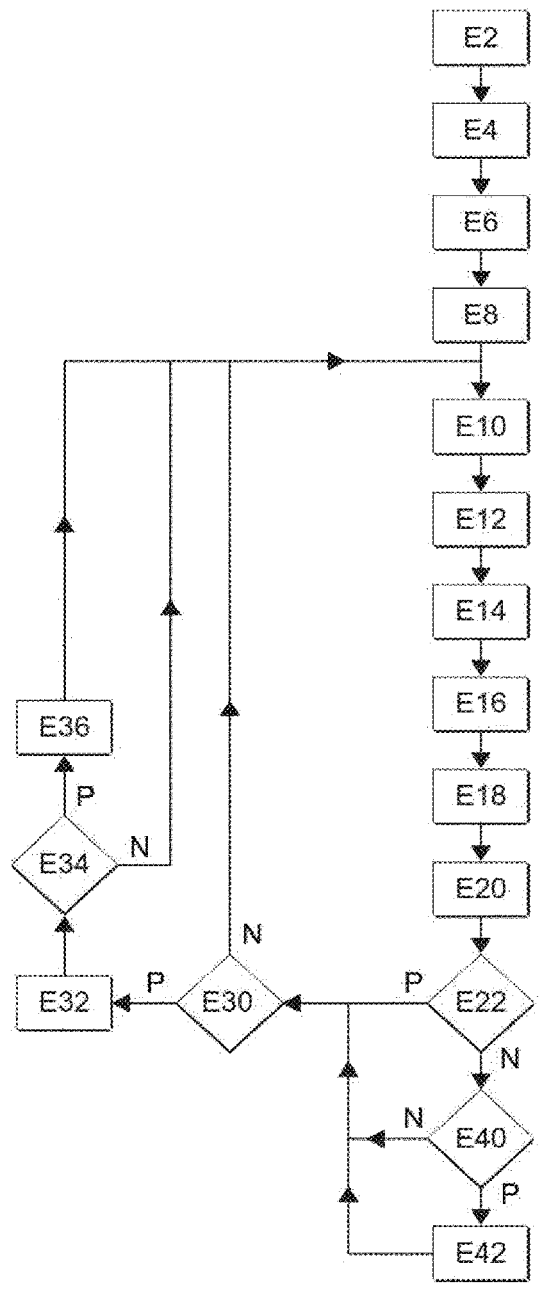
FIG. 2 shows, in the form of a flowchart, one example of a method for controlling a device of the motor vehicle according to the invention.

For this purpose, the control method comprises a succession of steps, shown in the form of a flowchart in [FIG. 2].

As shown in this figure, the method starts with step E2 of initializing a temporal variable t. This temporal variable t corresponds to the time when the method starts being implemented. For example, here, this temporal variable t is initialized at the time to.

The method then continues with step E4. In this step, the computer 3 receives a plurality of initial data. These initial data generally characterize a state of the motor vehicle 1 and the environment external to the motor vehicle 1 at the time to.

More precisely, the state of the motor vehicle 1 is characterized in particular by data specifying the state of the various devices of the motor vehicle 1. For example, the initial data characterize the engine speed, the open or closed status of the windows, the state of the lighting devices of the motor vehicle, etc.

The initial data concerning the environment external to the motor vehicle 1 index for example external brightness, road signposts near the vehicle 1, traffic conditions (with the presence or absence of congestion on certain roads), or else the presence of particular events, such as demonstrations or sporting events, which are liable to disrupt traffic in the proximity of the motor vehicle 1.

These initial data also comprise data concerning the occupants of the motor vehicle 1, and more particularly concerning the driver of the vehicle 1. For example, the initial data characterize the profile of the driver with their age, their preferred settings, their physiological or mental state or else the gaze direction of the driver at the time to.

In practice, some of these initial data are stored in the memory of the computer 3 before the method is implemented and are therefore available directly from this memory (as is the case for example with the preferences of the occupants of the motor vehicle 1).

For other initial data, such as for example the gaze direction of the driver, external brightness or engine speed, the appropriate sensors transmit the information needed for the computer 3 to determine the desired data.

By way of example, these initial data may comprise the navigation information according to which the motor vehicle 1 is joining a section of expressway. They may also index the preferences of the driver when they are traveling on an expressway (rhythmic music broadcast by the loudspeakers, medium ventilation, temperature at 19 degrees, etc.). These initial data may also indicate the time of day corresponding to the current time (dawn, morning, middle of the day, afternoon, dusk, evening, night, each of these parameters being defined for example on the basis of an associated time window) or the preferred brightness settings for the driver (this datum being for example a value between 0 and 1, with 0 corresponding to total darkness and 1 corresponding to full brightness).

The method continues in step E6, in which the computer 3 determines an initial vector. This initial vector comprises values obtained computationally using the initial data received in step E4. In this description, the term vector refers to a variable identifying a set of parameters (here the values computed based on the initial data). The initial vector here has a dimension greater than or equal to 2.

This initial vector therefore here comprises as many parameters as there are values computed based on the initial data, and represents the motor vehicle 1 in the form of a configuration of the desirable control profile for the motor vehicle 1 at the time to.

Given the definition of the initial data, the parameters forming the initial vector are therefore determined in real time. They are obtained based on the data stored in the various databases of the memory of the computer 3, or come from sensors present in the motor vehicle 1. As a variant, some of these parameters may be obtained based on algorithms, for example machine learning methods.

Finally, the initial vector transcribes all of the initial data so as subsequently to be able to be transformed into the form of control instructions by the computer 3.

In the example mentioned above, the initial vector therefore transcribes the fact that the motor vehicle has joined a section of expressway, and the preferences of the driver associated with this type of road.

By way of example, the initial vector comprises a parameter that transcribes the target brightness for the control of the motor vehicle 1. This target brightness depends on the time of day corresponding to the time to and the preferred brightness settings for the driver.

For example, this target brightness may be expressed according to the following formula:

$$Lum_c = fct(mmt_{day}) \times pref_{lum} \qquad \text{[Math.]}$$

where $Lum_c$ is the target brightness, $mmt_{day}$ is the corresponding time of day, $pref_{lum}$ is the preferred brightness settings for the driver and fct is a time-of-day function, this function taking values between 0.2 (corresponding to the minimum brightness at night) and 1 (corresponding to a maximum brightness obtained at midday).

Preferably, this function does not take a minimum value of zero in order to avoid complete darkness at night.

This initial vector then makes it possible to determine an initial control profile for controlling one or more of the devices of the motor vehicle 1.

In this description, a "control profile" will be understood to mean a set of control instructions intended to actuate one or more of the devices of the motor vehicle 1 so as to adapt driving and comfort for the occupants of the vehicle on the basis of the characteristic initial data at the time under consideration. In other words, the control profile corresponds to a particular multisensory ambience.

In practice, each control profile is represented here by an associated profile vector. Each component of each profile vector has a value that reflects the corresponding control instructions.

Here, the memory of the computer 3 stores a plurality of predetermined control profiles (each control profile therefore corresponds to a distinct multisensory ambience). These predetermined control profiles (and more particularly the associated profile vectors) are determined before the control method is implemented, by way of a preliminary method that is described later in this description.

In step E8, the computer 3 selects, from among the plurality of predetermined control profiles, the initial control profile, that is to say the profile vector corresponding to the initial vector (and therefore to the initial data at the time to).

This selection is carried out for example by determining the predetermined control profile that best corresponds to the initial vector. In practice, this is carried out for example by computing distances between the initial vector and each of the profile vectors corresponding respectively to each of the predetermined control profiles. This computation is carried out for example using a least squares method.

The initial control profile is then selected as corresponding to the smallest distance computed between the initial vector and the profile vector in question (therefore corresponding to a particular predetermined control profile).

As a variant, the initial control profile may be selected directly by an occupant of the motor vehicle (for example the driver). For example, the driver will choose an initial control profile based on their wishes.

This initial control profile is then output by the computer 3 in order to actuate the various devices in question of the motor vehicle 1 (step E10). The associated multisensory ambience is therefore output in the motor vehicle 1.

In the example mentioned above, this then means that the loudspeakers present in the passenger compartment broadcast music corresponding to the preferences of the driver of the vehicle 1 on an expressway in the conditions associated with the time of day and the determined location, and that the temperature inside the passenger compartment 7 is set to 19 degrees.

For the rest of the method, the initial control profile is called "current control profile" (referring to the control profile output in the motor vehicle 1).

As shown in [FIG. 2], the control method continues in step E12, in which the temporal variable t is incremented by a predetermined time increment. The time at which the following steps are implemented (after incrementation) is hereinafter called "current time".

Steps E12 to E42 are implemented here in a loop with a regular time increment. For example, they are implemented every second while the motor vehicle 1 is moving. As a variant, the time increment could of course be greater than one second, for example of the order of around ten seconds.

In step E14, the computer 3 updates the initial data with the new current values of the parameters. Like for the initial data, the updated data characterize the state of the motor vehicle at the current time, along with the external environment surrounding the vehicle 1. The updated data also comprise data characterizing the occupants of the vehicle and their preferences at the current time.

Parameters whose value has not changed with respect to the previous time are not modified (and therefore keep the value of the initial data). This then makes it possible to update only the values of the parameters that have been modified since the previous time, since each of the parameters contained in these initial data have their own change frequency. For example, the age of the driver will change only when the person changes, whereas the gaze direction of the driver will change more frequently (when the driver moves their head or looks in the rear-view mirrors for example).

The method then continues in step E16, in which the computer 3 determines an updated vector (in a manner similar to the determination of the initial vector as described above). This updated vector depends on the updated data received in step E14. The updated vector has a dimension greater than or equal to 2.

Next, based on this updated vector, the computer determines a "control change appropriateness parameter" (step E18). This control change appropriateness parameter evaluates whether it is appropriate to change control profile following the updating of the data. In other words, this control change appropriateness parameter makes it possible to evaluate whether another control profile would be more suitable for the updated data than the current control profile for the driving of the motor vehicle.

A "change of control profile" will be understood to mean the replacement of the current control profile with a control profile more suitable for the updated data (this control profile being selected from among the predetermined control profiles stored in the memory of the computer 3).

The control change appropriateness parameter depends on the updated vector determined in step E14. This parameter is computed, for each predetermined control profile, based on the updated vector and on the profile vector corresponding to the predetermined control profile in question.

For example, for each predetermined control profile, the computer 3 computes the distance between the updated vector and the profile vector corresponding to this predetermined control profile. This computation is carried out for example using a least squares method.

Thus, at the end of step E18, the computer 3 has determined as many control change appropriateness parameters as there are stored predetermined control profiles.

Next, the computer 3 compares each of the control change appropriateness parameters with one another in order to select the most suitable control profile (E20).

If the control change appropriateness parameter is determined based on a distance computation, the most suitable control profile (also called updated control profile hereinafter) is selected by choosing the one corresponding to the smallest computed distance (as was the case for the selection of the initial control profile).

As shown in [FIG. 2], the method then continues in step E22, in which the computer 3 evaluates whether the selected updated control profile is the same as the current control profile.

If this is the case (that is to say if the updated control profile and the current control profile are identical), the method continues in step E30.

In this step, the computer 3 determines whether a one-off point of interest (such as a one-off event) and/or a local point of interest (such as the date, the time of day or a geographical point of interest) is present in the environment of the motor vehicle 1. By way of example, a school forms a geographical point of interest in the sense that this location constitutes a hazardous area in which it will be necessary to draw the attention of the driver of the motor vehicle 1. Historical monuments or particular scenery (ocean, waterfall) also form geographical points of interest.

This determination is carried out based on the position of the motor vehicle 1 and map databases stored in the memory of the computer, in accordance with the following substeps.

First of all, the computer 3 identifies all geographical points of interest present, at the current time, within a predetermined area surrounding the motor vehicle 1. This predetermined area is for example a square with a side length of a few kilometers and of which the motor vehicle 1 forms the center.

A first selection is made from among all of the points of interest identified within this area. This selection is made for example by keeping only the N points of interest closest to the motor vehicle (N being a smaller number compared to all of the points of interest identified within the predetermined area).

Next, a score is computed for each of the N selected points of interest. For each selected point of interest, this score is computed taking into account the visibility of the point of interest to the occupants of the motor vehicle 1, but also the interest of the point of interest itself. Interest of the point of interest is understood to mean the historical significance, and/or the recreational interest, and/or the events planned in the corresponding location and/or the risk associated with this location. The computing of this score also takes into account the preferences of the occupants of the motor vehicle, for example by applying a weighting coefficient associated with the preferences of the occupants (this coefficient for example taking a value close to 1 for a point of interest in which the occupants have expressed an interest, and a value close to 0 in the case of a limited interest).

In practice, the default value of the score is 1 for each of the points of interest. This value is then either updated explicitly by the user on their initiative or by responding to a questionnaire initiated by the computer, or updated by a subsequent algorithm that interprets the actions of the occupants of the motor vehicle 1 or an action, in the vehicle, that is interpreted by the computer 3 as a sign of liking or disliking. The score is then incremented or decremented progressively.

The visibility of the point of interest is determined in accordance with the method described in document FR2112820.

The computer 3 lastly determines the most relevant point of interest by comparing the obtained scores. For example, it selects the point of interest corresponding to the highest score.

If this score is higher than a predetermined threshold, the computer 3 considers that a point of interest that warrants the attention of the occupants of the motor vehicle 1 has been detected in the environment of this vehicle 1. In this case, the method continues in step E32, in which the computer 3 determines a specific control profile associated with this selected point of interest.

In practice, the specific control profiles are stored beforehand in the memory of the computer 3. There are as many control profiles as there are geographical points of interest and temporal events (for example a birthday or a preprogrammed calendar alert). The specific control profiles are generic so as to cover all cases that are encountered. However, a specific control profile may be designed specifically for certain particular points of interest (such as historical monuments for example).

The method then continues in step E34. In this step, the computer 3 evaluates an additional criterion characterizing the relevance of outputting the specific control profile associated with this point of interest.

This additional criterion characterizes the relevance of outputting the specific control profile associated with the point of interest at the current time in order to draw the attention of the occupants of the motor vehicle 1 to this identified point of interest. In other words, this additional criterion makes it possible to evaluate whether it is expedient to output this specific control profile in the motor vehicle 1 so that it is beneficial for the occupants of the vehicle.

For example, the additional criterion takes into account the time that has elapsed since the current control profile was selected. This makes it possible to avoid an excessively fast change when the current control profile has been output for a short amount of time.

The additional criterion may also take into account the frequency of changing of control profiles. This makes it possible to avoid successively outputting different control profiles that may lead to the occupants of the motor vehicle 1 becoming bored and tired.

As a variant, the additional criterion may take into account a preference indicator associated with one of the occupants of the motor vehicle. This preference indicator may for example be stored in the memory of the computer 3. For example, the driver of the motor vehicle 1 has indicated beforehand that they like a particular control profile, and this will be able to be output again when a corresponding point of interest is located in the environment of the motor vehicle 1.

For example, this additional criterion may be evaluated on the basis of computing a coefficient of interest $Int_c$, defined by the following expression:

$$Int_c = \exp(-kt) \qquad \text{[Math.2]}$$

where t is the current time and k is what is known as an erosion coefficient. This erosion coefficient k therefore takes into account the fact that the occupants of the motor vehicle 1 might be bored and tired of the incessant control changes (and therefore changes of multisensory ambiences).

This additional criterion also depends on an interest stimulation coefficient. This interest stimulation coefficient makes it possible to stimulate the interest of the occupants with multisensory ambiences (associated with control profiles) that have not been output in the motor vehicle 1 for a predetermined period of time. This predetermined period of time is for example of the order of a few months. This interest stimulation coefficient thus provides a weighting in the determination of the additional criterion with regard to certain control profiles that might not have been output for a long time. This also makes it possible to limit boredom and tedium for the occupants of the motor vehicle.

Regardless of the additional criterion under consideration, if the computer 3 evaluates (in step E34) that this criterion is satisfied, the method continues in step E36. In this step, the specific control profile, associated with the point of interest, is output by the computer 3 in order to actuate the various devices in question of the motor vehicle 1. The associated multisensory ambience is therefore output in the motor vehicle 1 and then makes it possible to draw the attention of the occupants of the motor vehicle 1 to the identified point of interest. In practice, the transition from one control profile to another is carried out on the basis of parameters associated with the new control profile to be output. This transition is carried out so as to guarantee the desired multisensory ambience with the output of the new control profile (here the specific control profile). The transition from one control profile to another also takes place taking into account the motor vehicle context (for example, in "sport" mode, the transitions will be faster and sharper) and the preferences of the occupants of the motor vehicle (which are indicated by the occupants themselves or deduced by an algorithm for interpreting the actions of the occupants in the motor vehicle).

For example, if the identified point of interest is a school on a right-hand part of the road on which the motor vehicle

1 is traveling, the specific control profile comprises outputting an acoustic warning on the right-hand side of the passenger compartment when the vehicle is traveling alongside this school.

The specific control profile is output here on a one-off basis over a predetermined duration. This duration is associated with the point of interest. In other words, the specific control profile is output for example for as long as the identified point of interest is located within the predetermined area surrounding the motor vehicle 1. In the example of the school, the acoustic warning is output within an area close to the school and stops once the motor vehicle 1 has passed this school.

This specific control profile may for example be output on its own (the current control profile therefore being interrupted) or on top of the current control profile.

The control method then returns to step E12, in which the temporal variable is incremented by a time increment so as to execute the control method at the following time.

If, in step E32, the additional criterion is not satisfied, only the current control profile continues to be output in the motor vehicle 1. The method then returns to step E12.

If, in step E30, the score associated with the selected point of interest is lower than the predetermined threshold, it is not necessary to draw the attention of the occupants to the subject to which it relates. Only the current control profile continues to be output in the motor vehicle 1. The method returns to step E12.

If, in step E22, the computer 3 has concluded that the selected updated control profile was different from the current control profile, the method continues in step E40. Since the two control profiles are different, the control profile could be changed, but the computer 3 first evaluates the possibility of changing control profile. In other words, in step E40, the computer 3 determines whether it is relevant, at the current time, to modify the current control profile with the updated control profile.

For this purpose, the computer 3 evaluates an "additional criterion" characterizing the relevance of a change of control profile at the current time. In other words, the additional criterion makes it possible to evaluate whether it is expedient to change the current control profile. This additional criterion therefore characterizes the relevance of a change of control profile at the current time in order for this change to be beneficial for the occupants of the motor vehicle 1. This step is similar to step E34 described above.

As indicated, this additional criterion takes into account the time that has elapsed since the current control profile was selected. It also takes into account the frequency of changing of control profiles.

This additional criterion may also concern the presence of a noteworthy event (for example an upcoming storm) for the occupants of the vehicle or in their environment. The change in the control profile would then make it possible to highlight or provide a warning about this noteworthy event.

In this case too, the additional criterion may take into account a preference indicator associated with one of the occupants of the motor vehicle.

Regardless of the additional criterion under consideration, if the computer 3 evaluates (in step E40) that this criterion is satisfied, the method continues in step E42. In this step, the updated control profile is output by the computer 3 in order to actuate the various devices in question of the motor vehicle 1. The associated multisensory ambience is therefore output in the motor vehicle 1.

As indicated above, the transition from the current control profile to the updated control profile is carried out on the basis of parameters associated with this updated control profile. In other words, the transition is carried out so as to be consistent with the desired multisensory ambience.

This updated control profile then becomes the current control profile. The method continues with step E30 (as described above).

If, in step E40, the additional criterion is not satisfied, the updated control profile is not used by the computer 3 and the method continues in step E30 described above.

Of course, the driver or the occupants of the motor vehicle 1 may deactivate the outputting of the control profile at any time. In this case, no control profile is output in the motor vehicle and no multisensory ambience is output therein.

As indicated above, the control profiles are predetermined, before the method described above is implemented, by way of a "preliminary method for determining a plurality of predetermined control profiles".

This preliminary method is implemented in practice during the design of the vehicle. It comprises a succession of steps, shown in [FIG. 3] in the form of a flowchart, that make it possible to identify multiple usable control profiles.

Each predetermined control profile is based on a succession of mutually synchronized instructions for each device of the motor vehicle 1. As illustrated, each control profile may be seen as a partition (in the musical sense) of instructions for each device of the motor vehicle. In other words, the instructions of each control profile are therefore coordinated and combined consistently in order to obtain an associated multisensory ambience that is pleasant for the occupants of the vehicle (when this ambience is output in the vehicle).

For this purpose, the preliminary method starts in step E50. In this step, the computer 3 determines, for each device of the motor vehicle 1, a plurality of lists of control instructions for this device. Each list of control instructions corresponds to a representation of the desired multisensory ambience, associated with the control profile in question.

Each list of control instructions (for each device) takes into account the various signals involved, their duration, their intensity, etc. For example, to output a succession of acoustic signals, a list of control instructions comprises the order of the broadcast signals, the duration for which each acoustic signal is broadcast, the broadcast volume of each acoustic signal, the transitions for changing from one of the acoustic signals to another, etc.

Thus, at the end of step E50, the computer 3 possesses various lists of control instructions for each device of the motor vehicle 1 (independently of the other devices).

The method continues in step E52, in which the computer 3 generates a plurality of instruction matrices, each associated with a desired multisensory ambience. Each instruction matrix groups together the instructions associated with this multisensory ambience for all of the devices of the motor vehicle 1.

Next, for each multisensory ambience, the instructions in each instruction matrix are arranged temporally so as to synchronize them (step E54). In other words, the duration of each of the instructions for each device is adapted on the basis of the instructions for the other devices so as to be able to generate the desired multisensory ambience. A plurality of final matrices is thus determined. In these final matrices, the control instructions for the various devices of the motor vehicle are synchronized.

Figure 3:
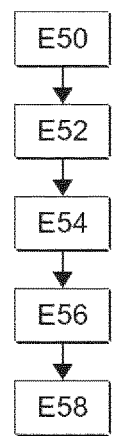
FIG. 3 shows, in the form of a flowchart, one example of a preliminary method according to the invention.

As shown in [FIG. 3], the method continues in step E56. In this step, the control instructions in each final matrix are converted in order to be able to be executed by the computer 3 (in order to synchronously actuate the various devices of the motor vehicle 1). This then makes it possible, based on each final matrix, to generate a control profile associated with the desired multisensory ambience.

A plurality of predetermined control profiles is therefore determined based on the plurality of final matrices.

These predetermined control profiles are then stored, in step E58, in the memory of the computer 3 in order to be used in the control method as described above.

The invention claimed is:

1. A method for controlling at least one device of a motor vehicle, the method comprising:

in a first time increment, receiving a plurality of data characterizing a state of the motor vehicle, an environment external to the motor vehicle, and data concerning at least one occupant of the motor vehicle, determining an initial vector based on the plurality of received data, selecting, from among a plurality of predetermined control profiles for controlling said at least one device, a first control profile based on the initial vector, outputting said first control profile so as to control said at least one device of the motor vehicle, and then, in a second time increment, updating at least some of the plurality of data characterizing the state of the motor vehicle and the environment external to the motor vehicle, determining an updated vector based on the updated data, selecting a second control profile based on the updated vector, and when the second control profile is different from said first control profile, outputting said second control profile so as to update the control of said at least one device of the motor vehicle.

2. The method as claimed in claim 1, further comprising evaluating an additional criterion relating to a relevance of a change of control profile for said at least one device, said outputting the second control profile being implemented when the evaluated additional criterion is satisfied.

3. The method as claimed in claim 2, wherein the additional criterion depends on a time that has elapsed since the first control profile was selected and/or on a frequency of changing of control profiles and/or on a presence of a point of interest identified in the environment of the motor vehicle.

4. The method as claimed in claim 3, wherein the additional criterion also depends on a preference indicator associated with an occupant of the motor vehicle.

5. The method as claimed in claim 1, wherein the second control profile is selected by determining, for each predetermined control profile, a control change appropriateness parameter, based on said updated vector and of a profile vector corresponding to the predetermined control profile.

6. The method as claimed in claim 5, wherein, for each predetermined control profile, the control change appropriateness parameter is determined by computing a distance between the updated vector and the profile vector corresponding to the control profile.

7. The method as claimed in claim 6, wherein the second control profile is selected as corresponding to the control change appropriateness parameter associated with a smallest computed distance.

8. The method as claimed in claim 1, further comprising:

locating a one-off and/or local point of interest in the environment of the motor vehicle, determining a specific control profile associated with said point of interest, and outputting said specific control profile so as to control said at least one device of the motor vehicle.

9. The method as claimed in claim 8, wherein the specific control profile is output on a one-off basis for a predetermined duration.

10. The method as claimed in claim 9, wherein said predetermined duration is associated with the point of interest.

11. The method as claimed in claim 1, further comprising, before the receiving the plurality of data:

determining a first list of instructions for a first device of the motor vehicle, determining a second list of instructions for a second device of the motor vehicle, determining a final matrix by synchronously combining the first and the second list of instructions, and determining a control profile based on the determined final matrix in order to synchronously control the first device and the second device.

12. A motor vehicle comprising a computer configured to implement the method as claimed in claim 1.

* * * * *